(12) United States Patent
Mowill

(10) Patent No.: US 7,162,874 B2
(45) Date of Patent: Jan. 16, 2007

(54) APPARATUS AND METHOD FOR GAS TURBINE ENGINE FUEL/AIR PREMIXER EXIT VELOCITY CONTROL

(75) Inventor: R. Jan Mowill, Hengelo (NL)

(73) Assignee: HIJA Holding B.V., Hengelo (NL)

( * ) Notice: Subject to any disclaimer, the term of this patent is extended or adjusted under 35 U.S.C. 154(b) by 293 days.

(21) Appl. No.: 10/902,089

(22) Filed: Jul. 30, 2004

(65) Prior Publication Data

US 2006/0021354 A1 Feb. 2, 2006

(51) Int. Cl.
*F02C 9/52* (2006.01)
(52) U.S. Cl. .................... 60/773; 60/39.27; 60/737
(58) Field of Classification Search ............. 60/39.23, 60/39.27, 737, 773, 776
See application file for complete search history.

(56) References Cited

U.S. PATENT DOCUMENTS

| | | | | |
|---|---|---|---|---|
| 3,978,658 | A | * | 9/1976 | Forbes et al. ............ 60/39.27 |
| 4,299,088 | A | * | 11/1981 | Rowen et al. ............ 60/39.27 |
| 5,339,620 | A | * | 8/1994 | Ikeda et al. ............... 60/773 |
| 5,349,812 | A | * | 9/1994 | Taniguchi et al. ........ 60/39.23 |
| 5,481,866 | A | * | 1/1996 | Mowill .................... 60/39.23 |

* cited by examiner

Primary Examiner—L. J. Casaregola
(74) Attorney, Agent, or Firm—Finnegan, Henderson, Farabow, Garrett & Dunner, LLP

(57) ABSTRACT

A gas turbine engine with a single stage combustor includes an external premixer to provide premixed fuel/compressed air to the combustor as well as compressed air for dilution; and an automatic controller to provide feedback control of the compressed air flow and fuel flow to the premixer in accordance with actual power versus power demand. The fuel/compressed air mixture is combusted in a combustor and the combustion gases and dilution air are expanded in a turbine. The engine further includes a bleed valve under control of the controller for diverting sufficient compressed dilution air past the turbine to induce increased fuel flow and compressed air flow to the premixer for delivery to, and combustion of, the combustor to compensate for the power deficit due to the bled air, to provide selected minimum premixer exit velocities during engine operation.

20 Claims, 1 Drawing Sheet

APPARATUS AND METHOD FOR GAS TURBINE ENGINE FUEL/AIR PREMIXER EXIT VELOCITY CONTROL

BACKGROUND OF THE INVENTION

1. Field of the Invention

The field of the present invention is gas turbine engines and, more particularly, to apparatus and methods for operating gas turbine engines having premixers for providing premixed fuel and air for combustion therein.

2. Description of the Prior Art

Gas turbine engines using external premixers are known, including single stage combustion systems with convection cooled combustors, based on the previous work of the present inventor, such as are disclosed, e.g., in U.S. Pat. No. 5,377,483; U.S. Pat. No. 5,477,671; U.S. Pat. No. 5,481,866; U.S. Pat. No. 5,572,862; U.S. Pat. No. 5,613,357; U.S. Pat. No. 5,638,674; and U.S. Pat. No. 6,220,034. These systems provide close control of the fuel/air ratio by premixing all of the fuel for combustion with essentially all the combustion air using a premixer having a venturi-type mixing tube, and introducing the mixture to the combustion zone of the combustor. Significant reductions in gaseous and particulate emissions have been achieved over a broad range of operating conditions by gas turbine engines, employing the inventions disclosed in the above-listed patents.

However, single stage combustors with external premixers can experience "flashbacks" from the combustor into the premixer, which can occur when the flame speed is greater than the velocity of the fuel/air mixture in the premixer exit. Flashbacks can adversely affect the mechanical integrity and performance of the premixer system and related structure. Flashbacks occur generally during low power operation at the time of minimum premixer exit velocities. Also, pressure "pulsations" in the combustor can occur when the pressure drop across the premixer exit is low, again typically during minimum velocity conditions, due to a feedback effect on the fuel/air mixture flow rate from the premixer.

Moreover, simply decreasing the exit area to increase velocity often is not an option, particularly in fixed exit area constructions because it is also desirable to fix the premixer exit area to provide exit velocities less than that which would cause unwanted impingement at high power high exit velocity operation. Impingement of the flow onto the combustor wall will increase heat transfer and increase thermal fatigue. High premixer exit velocities also can reduce combustor volumetric efficiency by limiting combustion until mixture velocities have subsided.

Also, recent tests have shown that operation of engines of the type described in my aforementioned patents can experience structural damage of the combustor, typically during rapid decreases from high power operation. It is believed that the overpressures resulting from such "load shedding," where a very large portion (≈80%) of the compressed air is forced to travel through the convection cooling channels, can sometimes structurally deform or otherwise damage the combustor which, when heated, has diminished strength.

Apparatus and methods which can diminish the occurrence or severity of one or more of the flashback, pulsations, impingement, and overpressure phenomena in gas turbine engines with external premixers, particularly single stage combustor systems with convective cooling, would be highly useful improvements.

SUMMARY OF THE INVENTION

In accordance with the present invention, as broadly described and claimed herein, a gas turbine engine includes an air compressor, a premixer for mixing fuel with a first portion of compressed air to provide a fuel/air mixture the premixer having a fixed area exit, and a combustor for receiving and combusting the mixture to provide combustion gases. The compressor also provides a second portion of the compressed air to the combustor exit as dilution air. The engine also includes a compressed air valve for controlling the first compressed air portion, a fuel valve for controlling fuel flow to the premixer, and a turbine operatively connected to the combustor for expanding the combination of combustion gases and the second portion of compressed air (dilution air) to drive the compressor and provide net power. The engine further includes an engine controller responsive to engine power and engine power demand for controlling the fuel valve and the air valve, wherein in response to a decrease in engine power relative to engine power demand the controller will increase the fuel flow and air flow to the premixer and thereby the mixture exit velocity. The engine still further includes means for diverting part of the second portion of compressed air to bypass at least the turbine, and wherein the engine controller is also operatively connected to the diverting means for selectively controlling the bypass air flow to maintain at least a minimum mixture flow velocity through the premixer exit.

Preferably, the combustor includes a cooling shroud defining in part a flow path for the second portion of compressed air, and wherein the engine controller also selectively controls the diverting means to divert a sufficient amount of compressed air to minimize buckling of the combustor.

Also, in accordance with the present invention, as broadly described and claimed herein, a method of operating a gas turbine engine of the type having an air compressor driven by a turbine for supplying compressed air through an air valve to a premixer for mixing with fuel to provide a fuel/air mixture for delivery to a combustor through a premixer exit, for generating combustion gases, the compressor also supplying compressed air to the combustor exit as dilution air, the turbine extracting power from both the combustion gases and dilution air, where the method includes controlling the fuel flow and compressed air flow to the premixer to provide a sufficient fuel/air mixture to the combustor to maintain a preselected power level, and selectively diverting a portion of the dilution air past the turbine, whereby power cannot be extracted by the turbine from the diverted air portion, the diverting step thereby resulting in a temporary power deficit. The diverting step further includes diverting sufficient dilution air such that a controlled increase in the flow of fuel and air to the premixer to make up the temporary power deficit provides at least a selected minimum fuel/air mixture velocity through the premixer exit.

Preferably, where the combustor has a cooling shroud, the liner defining in part a flow path for the dilution air portion, the diverting step also includes diverting a sufficient amount of dilution air to minimize buckling of the combustor.

DESCRIPTION OF THE PREFERRED EMBODIMENTS

Figure 1B:
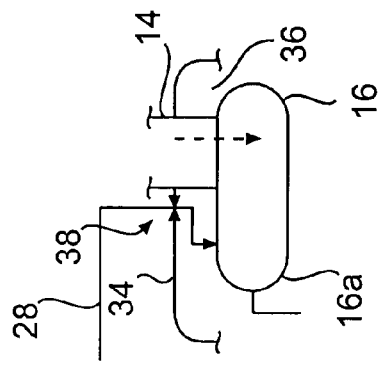
FIG. 1B is a schematic of a variation of the combustor system gas turbine engine of FIG. 1A.

The gas turbine engine of the present invention includes a gas turbine engine including a compressor for providing compressed air; a premixer for providing a fuel/compressed air mixture; a combustor for combusting the fuel/air mixture; and a turbine for expanding the gases received from the combustor to provide power and driving at least the compressor. As embodied herein and with reference to FIG. 1A, gas turbine engine 10 includes compressor 12, premixer 14, combustor 16, and turbine 18, all shown schematically. Turbine 18 is operatively connected to drive compressor 12, and also load 20, via shaft 22, which load can be electrical, mechanical, hydraulic, etc.

Figure 1C:
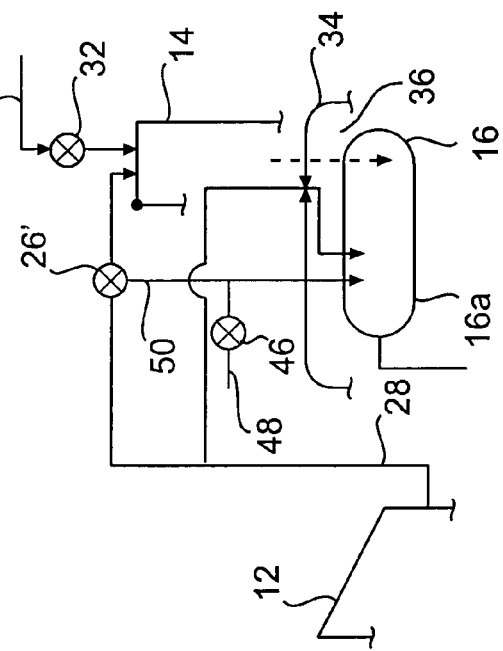
FIG. 1C is a schematic of another variation of the combustor system of FIG. 1A.
Figure 1A:
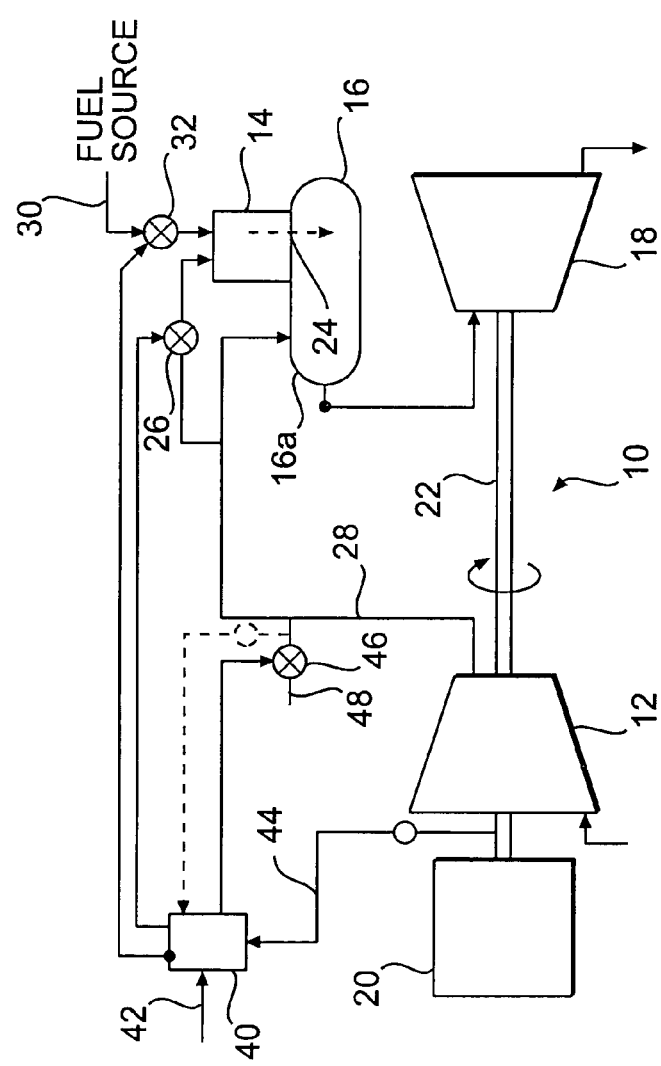
FIG. 1A is a schematic of a gas turbine engine made in accordance with the present invention.

With continued reference to FIG. 1A, premixer 14 receives compressed air from compressor 12 via air valve 26 and fuel from a fuel source (not shown) via fuel conduit 30 controlled by fuel valve 32. As depicted in FIG. 1A, air valve 26, which can be a butterfly-valve type, is supplied from compressed air passageway 28 which can be of a variety of configurations, such as that partially defined by the engine pressure vessel, as shown in my U.S. Pat. No. 6,220,034.

Premixer 14, which can include a venturi-type mixing tube, provides a fuel/air mixture to combustor 16 through premixer exit 24. While any premixer exit configuration can be used, the present invention is particularly useful in premixers with "nozzle" type, fixed area exits such as shown in my U.S. Pat. No. 6,220,034. The nozzle exit configuration functions to distribute the fuel/air mixture within the combustor volume to increase volumetric efficiency.

Gas turbine engine 10 can be of the radial, axial, or mixed axial-radial types. That is, compressor 12 can be radial or axial, and turbine 18 can be radial or axial, depending upon the application. Also, combustor 16 can be any of the annular, canannular, or can types. However, the present invention is particularly advantageous when used with an annular, single stage combustor such as shown and described in my previous patent U.S. Pat. No. 6,220,034, the disclosure of which is hereby incorporated by reference, to provide an increased combustion volume, and provide longer average residence times for the fuel/air mix to combust.

With reference to FIG. 1A, combustor 16 also is configured to receive a separate or second portion of compressed air at combustor exit region 16a for diluting and cooling the combustion gases prior to admission to turbine 18. Significantly for the purpose of the present invention, this dilution air undergoes power producing expansion in turbine 18 in combination with the combustion gases. Hence, a fraction of the power produced by engine 10 results from expansion of this dilution air in turbine 18.

As indicated above, some or all of this dilution air may be used to convectively cool a portion or all of the exterior walls of combustor 16 prior to entering combustor exit 16a as detailed in the embodiment in the FIG. 1B schematic. Specifically, FIG. 1B shows cooling shroud 34 partially surrounding combustor 16, which shroud provides one or more cooling flow passages 36 for the dilution air to cool the combustor walls before entry into the dilution zone of combustor 16 at exit region 16a. Cooling flow passages 36 are supplied by compressed air from passage 28 through apertures 38, some or all of which apertures can be configured for impingement cooling.

With reference again to FIG. 1A, gas turbine engine 10 includes engine controller 40 which can be a microprocessor under program control. Controller 40 is responsive to power demand such as represented schematically by input 42 which, for example, can be a signal representing desired power generated by any conventional input device, such as a preselected, desired shaft speed for a single shaft, constant speed application, to be discussed hereinafter. Engine controller 40 is operatively connected to air valve 26 and fuel valve 32 to provide control of the fuel and air admitted to premixer 14 in accordance with the power demand. Preferably, for reasons detailed in my previous patent U.S. Pat. No. 6,220,034, engine controller 40 is also preferably programmed to provide a preselected fuel/air ratio for engine operation by way of its control of air valve 26 and fuel valve 32.

It is also preferred that engine controller 40 is responsive to a signal representing actual power output, such as signal 44 from an appropriate sensor and signal generating device associated with shaft 22. In a preferred single shaft constant speed engine embodiment, this signal can be generated by a shaft speed sensor, with sensed decrease from a preset constant speed being indicative of a decrease in power output, and a sensed increase in speed indicative of an increase in power output. In the embodiment depicted in FIG. 1A, engine controller 40 can be programmed to adjust the flow through air valve 26 and fuel valve 32 in response to deviations between actual power and power demand. Such feedback control can, for example, increase the flow of fuel and air to compensate for a sensed actual power output less than a desired output.

Shaft speed also may be a suitable control parameter for multi-shaft engines where the speed of the shaft of the power turbine is monitored and controlled. For variable speed engine applications, shaft torque or other parameters indicative of engine power can be monitored and controlled in accordance with the present invention.

In accordance with the present invention, the gas turbine engine is further provided with means for diverting part of the second or dilution portion of compressed air to bypass at least the turbine. As embodied herein, and with continued reference to FIG. 1A, controllable valve 46 is provided for diverting or "bleeding" a part of the compressed air flowing in passageway 28 to the atmosphere, that is, bypassing the interior of combustor 16 and turbine 18. Ducting 48 for the diverted air may be preferred to allow communication with the atmosphere depending on the shape and location of passageway 28 in the particular engine. Also, it should be understood that the upstream part of passageway 28 carries both the combustion air and the dilution air and is thus considered part of the flow path for each compressed air portion, for purposes of locating bleed valve 46 and ducting 48.

Also, in accordance with the present invention, the engine controller is operatively connected to the diverting means for selectively controlling the bypass air flow to maintain at least a minimum mixture flow velocity through the premixer exit. As embodied herein, and with continued reference to FIG. 1A, engine controller 40 is programmed to control valve 46 to divert part of the compressed air flow to bypass combustor 16 and turbine 18, such as directly to the atmosphere during certain engine operating conditions, usually during low power operations. As a result of the diversion, the total power extracted by turbine 18 would ordinarily decrease by an amount roughly proportional to the available pv energy lost with the diverted air. However, engine controller 40 also is programmed for feedback control based on a sensed discrepancy (decrease) in actual power output vs. power demand to adjust fuel valve 32 and air valve 26 to provide additional fuel and air to premixer 14 for delivery to, and combustion in, combustor 16 and subsequent admission to turbine 18. Turbine 18 would then expand the additional amount of combustion gases to extract increased power and the power deficit reduced or eliminated, as one skilled in the art would understand. Significantly for the purpose of the present invention, the resultant increase in the mixture mass and volume flow from premixer 14 to combustor 16 through exit 24 will also increase the premixer exit velocity providing increased margin to flashback and increased pulsation damping due to the increase in pressure drop across the exit.

FIG. 1C is a schematic depicting a variation of the air control apparatus shown in FIG. 1B. In FIG. 1B, all the dilution air is used for cooling prior to admission to the dilution zone of the combustor. Under certain conditions such as low power operation, large pressure drops can occur in the cooling passages due to the high volume of dilution air. In FIG. 1C, air valve 26' is a "3-way" valve which controls the flow of compressed air from passageway 28 not only to premixer 14, but also directly to the dilution zone of combustor 16 at exit region 16a via duct 50 and, preferably, separate dilution ports, thus bypassing cooling passages 36. In this way only part of the secondary air is used for cooling. As depicted in FIG. 1C, bleed valve 46 can advantageously be connected to duct 50 downstream of valve 26'.

In operation, and in accordance with the present invention, as embodied and broadly claimed herein, the method of operating a gas turbine engine of the type having an air compressor driven by a turbine for supplying compressed air through an air valve to a premixer for mixing with fuel to provide a fuel/air mixture for delivery to a combustor through a premixer exit, for generating combustion gases, where the compressor also supplies compressed air to the combustor exit as dilution air and the turbine extracts power from both the combustion gases and the dilution air, where the method includes controlling the fuel flow and compressed air flow to the premixer to provide a sufficient fuel/air mixture to the combustor to maintain a preselected power level. As embodied herein, and with reference again to the drawings, engine controller 40 controls gas turbine engine 10 at least throughout the entire power range and low power idle conditions through control of air flow to premixer 14 via valve 26 (or 26' for the cooling configuration FIG. 1C) and fuel flow to premixer 14 via valve 32. While not essential, it is highly preferred for certain constructions yielding low emission engine operation that engine controller 40 also will provide preselected fuel/air ratios by the joint control of air valve 26 (or 26') and fuel valve 32, as discussed in my patent U.S. Pat. No. 6,220,034.

As one skilled in the art would understand, engine control can be based on power demand, such as by using power demand signal 42 as input to controller 40, as depicted in FIG. 1A. It is highly preferred that engine controller 40 provides "closed loop" feedback control using a signal such as signal 44 representative of actual power output, as explained previously, although "open loop" control without feedback may be used in applications where a relationship has previously been established between the amount of diverted compressed air flow and the power deficit.

Further in accordance with the present invention, the gas turbine engine control method further includes diverting a sufficient portion of the dilution air past the turbine to provide at least a minimum premixer exit velocity. As explained above, this diversion, such as by using a bleed valve, will create a temporary power deficit requiring additional fuel and air to be supplied to the premixer (preferably, automatically via feed back control) to makeup the deficit. As a consequence of the additional fuel and air supplied to the premixer, a higher mixture mass and hence volume flow rate through the premixer exit will occur, a condition that should increase premixer exit velocities and provide a greater margin against flashback. This condition also should help mitigate possible combustion instabilities due to combustion pressure pulsations feeding back into the premixer due to the higher pressure drop across the exit. In the method carried out by the depicted preferred embodiment, engine controller 40 automatically controls air valve 26 (or 26') and fuel valve 32 to provide the additional fuel and air to premixer 14 to make up a deficit sensed from comparing actual power output signal 44, such as represented by shaft speed, with demand power signal 42, such as a preselected or target speed. Engine controller 40 also is programmed to control bleed valve 46 in accordance with the engine power level, and possibly other conditions, to regulate the occurrence and the amount of bleed air diverted from the dilution air flow, as one skilled in the art would understand.

Various control schemes are possible in accordance with the method of the present invention, such as carrying out the diverting step only during operation below a preselected power level. The preselected power level, of course, will be dependent upon the engine configuration and operating procedures, but it has been found that the present engine control method was advantageous below a power level of about 25% of rated power. Also, various bleed valve control schemes are possible including a simple on-off control scheme, a step-wise opening control scheme with two or more opening positions, or a continuously variable opening scheme in accordance with the engine power level. As one skilled in the art would appreciate, the continuously variable and multiple step-wise opening schemes can achieve closer control over the premixer exit velocity during varying low power conditions, and represents a more economical mode of operation in that the amount of diverted air represents a power loss to the system as a cost of better engine operating performance. However, where bleeding system costs or operational reliability is a primary factor, or where the relative amount of time spent at relatively low engine operating power levels would be small, a simple on-off control mode may be preferred.

As explained previously, it is also preferred that the diverting step of the present method also includes diverting a sufficient amount of compressed air to minimize buckling of the combustor. Again, it has been found that certain low power engine operations, particularly "load-shedding" during power decreases from high power operation, can result in unacceptably large pressure drops across the combustor walls due to the high ($\approx$80%) mass flow rate of dilution air flowing into the combustor through dilution ports, at a time when the combustor is in a relatively hot, weakened condition from the high power operation. Hence, for certain engine configurations and conditions, it may be advisable to divert more secondary air from the engine cycle than would otherwise be required to satisfy the minimum premixer exit velocity requirements, for the sake of maintaining combustor integrity, or possibly the integrity of other components of the compressed air distribution apparatus. Also, the apparatus such as a bleed valve used to divert the dilution air should preferably be "fast-acting" as the pressure drop peak occurs at or near the time of power cut-back when the combustor is the hottest.

Finally, one skilled in the art would understand that the apparatus and method of the present invention are highly suited for use in engine configurations having a fixed premixer exit area. However, the apparatus and method of the present invention can nevertheless also be used in conjunction with apparatus to vary the premixer exit area for providing a better control over premixer exit mixture velocities and pressure drops.

It will be apparent to those skilled in the art that various modifications and variations could be made in the apparatus and method of the present invention without departing from the scope or spirit of the invention.

What is claimed is:

1. A gas turbine engine comprising an air compressor, a premixer for mixing fuel with a first portion of compressed air to provide a fuel/air mixture the premixer having a fixed area exit, a combustor for receiving and combusting the mixture to provide combustion gases, the compressor also providing a second portion of the compressed air to an exit of the combustor as dilution air, a compressed air valve for controlling the first compressed air portion, a fuel valve for controlling fuel flow to the premixer, and a turbine operatively connected to the combustor for expanding the combustion gases and the dilution air to drive the compressor and provide net power, the engine further comprising:
 (1) an engine controller responsive to engine power output and engine power demand for controlling the fuel valve and the air valve,
  wherein in response to a decrease in engine power output relative to engine power demand the controller will increase the fuel flow and air flow to the premixer, whereby the mixture flow velocity through the premixer exit will also increase, and
 (2) means for diverting part of the second portion of compressed air to bypass at least the turbine, and
  wherein the engine controller is also operatively connected to the diverting means for selectively controlling the bypass air flow to maintain at least a selected minimum mixture flow velocity through the premixer exit.

2. The engine as in claim 1, wherein the engine includes a cooling shroud defining in part a flow path for the second portion of compressed air, and wherein the engine controller also selectively controls the diverting means to divert a sufficient amount of compressed air past the combustor and the turbine to minimize buckling of the combustor.

3. The gas turbine engine as in claim 1, wherein the diverting means includes a bleed valve positioned in a compressed air flow path downstream of the compressor and upstream of the air valve.

4. The gas turbine engine as in claim 1, wherein the premixer has a fixed area exit.

5. The gas turbine engine as in claim 1, wherein the combustor is a single stage combustor.

6. The gas turbine as in claim 1 wherein the engine controller includes a microprocessor under program control to provide a mixture with a preselected fuel/air ratio.

7. A gas turbine engine including a compressor for providing compressed air; a premixer for providing a fuel/compressed air mixture; a combustor for combusting the fuel/air mixture; and a turbine for expanding the gases received from the combustor to provide power and driving at least the compressor, the engine further comprising:
 (a) a first compressed air flow path from the compressor to the premixer, for air to be mixed with fuel, the resultant fuel/air mixture being provided via a premixer exit to the combustor for producing combustion gases, the combustion gases being thereafter provided to the turbine for power producing expansion therein;
 (b) a second compressed air flow path from the compressor for air bypassing the premixer for admission to the combustor as dilution air for mixing with the combustion gases and for expansion in the turbine;
 (c) a bleed valve operatively connected in the second compressed air flow path to divert air past the turbine;
 (d) an air valve operatively connected in the first compressed air flow path;
 (e) a fuel valve for controlling fuel flow to the premixer; and
 (f) an engine controller responsive to engine power demand and operatively connected to control the fuel valve and the air valve to provide a preselected fuel/air ratio to the premixer, the controller also being operatively connected to control the bleed valve to divert sufficient compressed air to provide a selected minimum mixture velocity through the premixer exit.

8. The apparatus as in claim 7, wherein the premixer exit has a fixed area.

9. The apparatus as in claim 7, wherein the engine controller also selectively controls the bleed valve to divert a sufficient amount of dilution air to minimize buckling of the combustor.

10. A method of operating a gas turbine engine of the type having an air compressor driven by a turbine for supplying compressed air through an air valve to a premixer for mixing with fuel to provide a fuel/air mixture for delivery to a combustor through a premixer exit, for generating combustion gases, the compressor also supplying compressed air directly to the combustor as dilution air, the turbine extracting power from both the combustion gases and dilution air, the method comprising:
 controlling the fuel flow and compressed air flow to the premixer to provide a sufficient fuel/air mixture to the combustor to maintain a preselected power level; and
 diverting a portion of the dilution air past the turbine, whereby power cannot be extracted by the turbine from the diverted air portion, the diverting step thereby resulting in a power deficit,
 wherein the diverting step includes diverting sufficient dilution air such that a controlled increase in the flow of fuel and air to the premixer to make up the power deficit provides at least a selected minimum fuel/air mixture velocity through the premixer exit.

11. The method as in claim 10, wherein the diverting step is carried out only during operation below a preselected power level.

12. The method as in claim 11, wherein the preselected power level is about 25% or less.

13. The method as in claim 10, wherein method includes flowing the fuel/air mixture from the premixer to the combustor through a fixed area exit.

14. The method as in claim 10, wherein the diverting step is carried out step-wise during engine operation.

15. The method as in claim 10 wherein the diverting step is carried out automatically under the control of an engine controller.

16. The method as in claim 15 wherein automatic control is automatic feedback control based upon deviation between power demand and a sensed actual power output.

17. The method as in claim 14 wherein the bleed valve is step-wise variable and is controlled by the controller to provide one or more discrete bypass flow rates.

18. The method as in claim 10 wherein the controlling step and the diverting step are carried out by a microprocessor under program control.

19. The method as in claim 10, wherein the diverting step also includes diverting a sufficient amount of dilution air past the combustor and the turbine to minimize buckling of the combustor.

20. The method as in claim 10 further including the step of controlling the fuel flow and the compressed air flow to the premixer to provide a preselected fuel/air ratio.

* * * * *